INVENTOR.
FRANK C. MOCK.
BY Robert C. Smith
ATTORNEY.

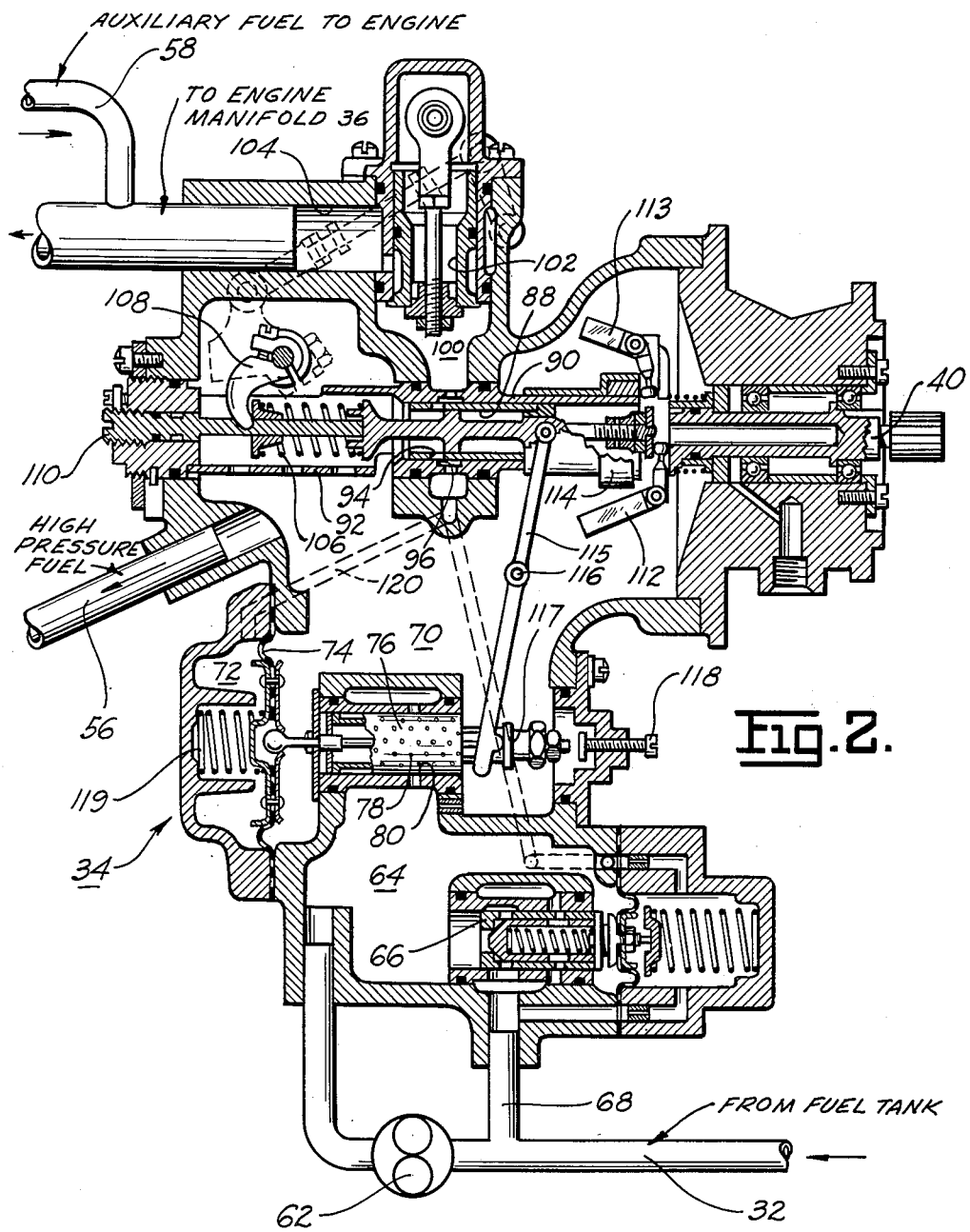

Feb. 20, 1962        F. C. MOCK        3,021,673
WATER INJECTION SYSTEM FOR GAS TURBINE ENGINES
Filed Jan. 10, 1957        5 Sheets-Sheet 5

INVENTOR.
FRANK C. MOCK.
BY
Robert C. Smith
ATTORNEY.

United States Patent Office 3,021,673
Patented Feb. 20, 1962

3,021,673
WATER INJECTION SYSTEM FOR GAS TURBINE ENGINES
Frank C. Mock, South Bend, Ind., assignor to The Bendix Corporation, a corporation of Delaware
Filed Jan. 10, 1957, Ser. No. 633,429
14 Claims. (Cl. 60—39.26)

This invention pertains to fuel systems and more particularly to a fuel system for gas turbine engines which are used in service requiring unusually high torque output such as in automotive applications.

As compared with the usual reciprocating engine power plant, an automotive gas turbine has the unfavorable characteristic that its rotating inertia or flywheel effect is so high as to appreciably slow down the rate of acceleration of the vehicle while the turbine is being brought from idle to high speed; for instance, it is common to have turbines which require from six to fifteen seconds for the full range acceleration without any external load. It has been determined that the acceleration of a gas turbine engine can be considerably improved if the mass flow through the turbine can be increased. This can be done by feeding water and additional fuel to the combustion chamber during the acceleration period. The water feed also aids indirectly by permitting a greater fuel flow without overheating the turbine blades. It should be noted that other fluids may be used instead of water and an excess amount of the regular fuel; for instance, alcohol, if injected during acceleration, would both supply additional hydrocarbon for combustion and help the cooling. There are various reasons why it is not desirable to rely on water, or other fluid, for continuous operation. This will become more apparent when one realizes that the actual mass of water injected into the system will approximate that of the fuel supplied; consequently, it is believed that the size of the water tank required for continuous operation would not be acceptable in most applications. It is therefore an object of the present invention to provide a fuel feeding system for improving the acceleration characteristics of gas turbine engines through the use of water or other fluids which are supplied to the engine in addition to fuel during the acceleration period.

It is another object of the present invention to provide a fuel feeding system in which auxiliary fuel and water are supplied in proper proportion to each other as well as engine and throttle requirements.

It is a further object of the present invention to provide a fuel and auxiliary fluid feeding system which is arranged to insure that the onset of water (or other fluid) feed will release the auxiliary fuel and that the flow of auxiliary fuel will stop when the water flow stops. It is a further object of the present invention to provide a fuel feeding system for gas turbine engines in which water (or other fluid) is supplied to the engine as a direct function of engine acceleration rate.

Other objects and advantages will become apparent from the following specification taken in connection with the accompanying drawings in which:

FIGURE 2 is a cross-sectional view of the main fuel control portion of my fuel and auxiliary fluid injection system.

Figure 1:
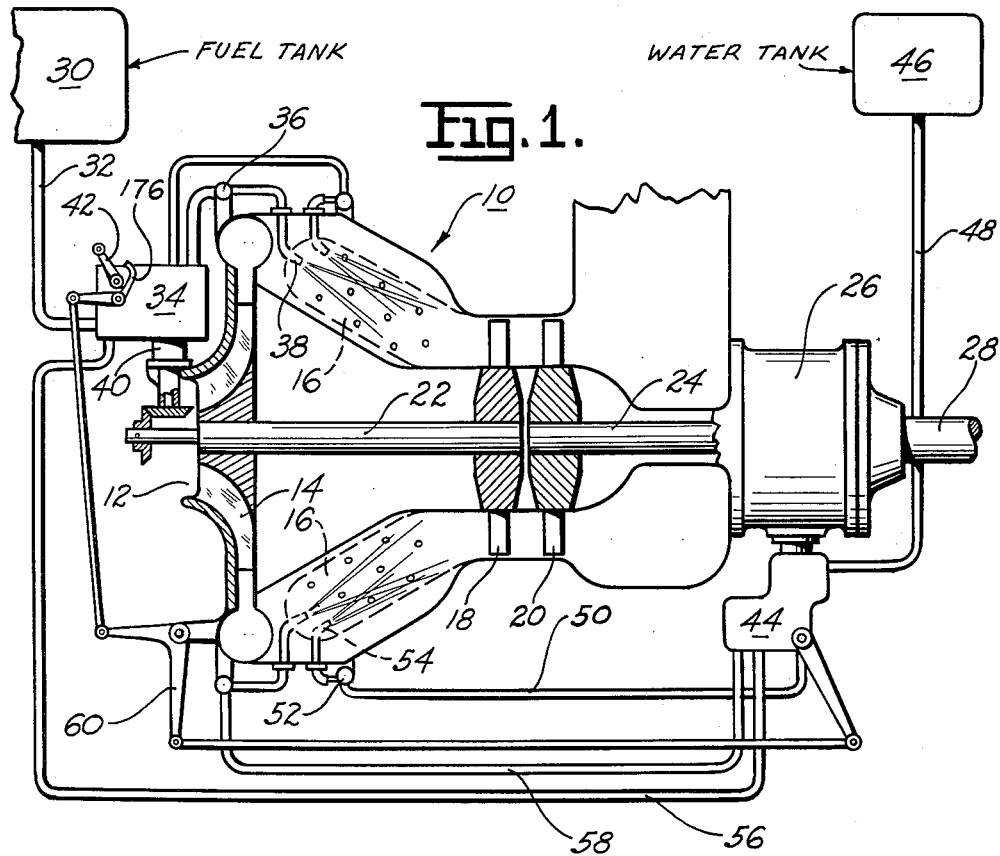
FIGURE 1 is a schematic diagram of a typical automotive gas turbine jet engine incorporating my fuel feeding system.

Referring now to FIGURE 1 a typical centrifugal type gas turbine engine is shown generally at numeral 10. This engine has an air intake 12, a centrifugal compressor wheel 14, which delivers air at high pressure to the combustion chambers 16, where it is mixed with fuel, ignited and delivered to the turbines 18 and 20. Turbine 18 is connected to a shaft 22 and drives the compressor wheel 14. The second turbine wheel 20 is connected to a shaft 24 which feeds into a gear box 26 to which the power drive is connected. A shaft 28 connects the gear box 26 with the wheels of the automobile or other driven structure. Fuel is supplied to the engine from a fuel tank 30 by means of a fuel conduit 32 which delivers fuel to a main metering unit 34. Fuel metering unit 34 supplies fuel to the fuel nozzle ring 36 which, in turn, feeds individual fuel spray nozzles 38 in each combustion chamber. Fuel metering unit 34 is connected through a shaft 40 to an extension of shaft 22 and to the throttle (not shown) by means of a link 42. A water or auxiliary fuel control 44 is driven from gear box 26. Water or auxiliary fluid is fed from the tank 46 through a conduit 48 to the water control 44 and thence through line 50 to a water nozzle ring 52 and thence to water nozzles 54 in each combustion chamber. The water feed is preferably arranged to discharge into the combustion chambers in such a way as not to affect the initial combustion but instead meet and mix with the burning gases after the combustion process is well along, and after high gas temperatures have been obtained. The water control unit 44 is connected to main metering unit 34 by means of a conduit 56, it being the function of control 44 to control the simultaneous injection of auxiliary fuel and water into the combustion chambers 16. Auxiliary fuel is supplied from water control unit 44 to the fuel nozzle ring 36 by means of a conduit 58. Water control 44 is also connected to main metering unit 34 through a throttle actuated linkage 60.

In FIGURE 2 the main metering unit is shown in section and is designated generally by numeral 34. This unit is a simplified version of a model commonly used on aircraft gas turbine engines and is described generally in my U.S. Patent No. 2,689,606. In this unit fuel is supplied from tank 30 through conduit 32 to a pump 62 where it is pressurized before being delivered to a chamber 64. A conventional by-pass valve 66 is connected to respond to a pressure differential between the outlet of the fuel pump 62 and the fuel pressure downstream of unit 34. It, therefore, maintains the pressure drop across the entire unit 34 at a desired value. Excess fuel is by-passed by valve 66 through a conduit 68 back to the inlet side of the pump 62. In the main metering unit 34 are shown a pair of chambers 70 and 72 divided by a metering head diaphragm 74. A regulator valve 76, provided with a series of ports 78, is connected to the diaphragm 74. The regulator valve is hollow and slidable within a casing 80. Fuel is delivered to the regulator valve from chamber 64. A throttle or metering valve 88 is slidably mounted in a valve body 90 having a hollow tubular section 92, said valve being provided with openings 94 adapted to register with coacting openings 96 in the valve body. Fuel in chamber 70 flows into the tubular extension 92 and thence through metering restrictions 94 and 96 to an annular metered fuel chamber 100. From the latter chamber, fuel flows across a cutoff valve 102 and then by way of a conduit 104 to fuel nozzle ring 36.

The throttle valve 88 is of the all-speed governor type; it is provided with a governor spring 106 which may be selectively set by the pilot through suitable linkage, lever 108 and associated members. An adjustable stop 110 limits valve 88 to a minimum flow position when closed. The right hand end of the stem of valve 88 acts to reset a pair of centrifugal governor weights 112 (only one of which is shown) mounted to rotate with the engine driven governor shaft 40. When the selected speed is reached, the governor weights balance the governor spring and an equilibrium condition is attained, whereupon the engine will operate at a substantially constant speed for the particular setting of the pilot's control lever.

The regulator valve 76 is positioned automatically as a function of engine speed and will maintain the fuel head across the throttle valve 88 within predetermined upper and lower limits; this is accomplished by applying the thrust exerted by a pair of centrifugal weights 113 (only one of which is shown) to the regulator valve 76 and its coacting diaphragm 74. The weights 113, however, act independently of the weights 112. Thus, while the weights 112 act on the inner end of the stem of the throttle valve 88, the weights 113 act on a sliding sleeve 114 having a connection with the shaft 40, said sleeve in turn having an operating connection with the upper end of a lever 115, the latter being fulcrumed at 116 and at its lower end being forked and contacting a thrust bearing 117 mounted on the stem of the regulator valve 76. As the speed of the engine driven shaft 40 increases, the weights 113 move radially outward and exert a force on the regulator valve 76 in a direction tending to open the latter; this force is opposed however, by fuel pressure acting on the diaphragm 74 in a direction tending to close said valve, the resultant differential being proportional to the square of engine speed. This differential is proportional to that imposed across the throttle valve 88, and for any given position of the latter valve the velocity and hence the fuel flow across the metering restrictions 94, 96 will be proportional to the square root of this differential or to engine speed directly.

An adjustable stop 118 determines the maximum open position of the regulator valve 76, while a spring 119 acting on the diaphragm 74 determines the minimum metering head at engine speeds which otherwise may be so low as to cause instability in the regulator system. A passageway 120 provides communication between chamber 72 and chamber 100 on the downstream side of the governor valve 88. The pressure drop across the governor valve 88 must be proportional to the square of engine speed. The control system just described is well known in the art, a somewhat more complex version having been used in military aircraft for several yers.

Figure 3:
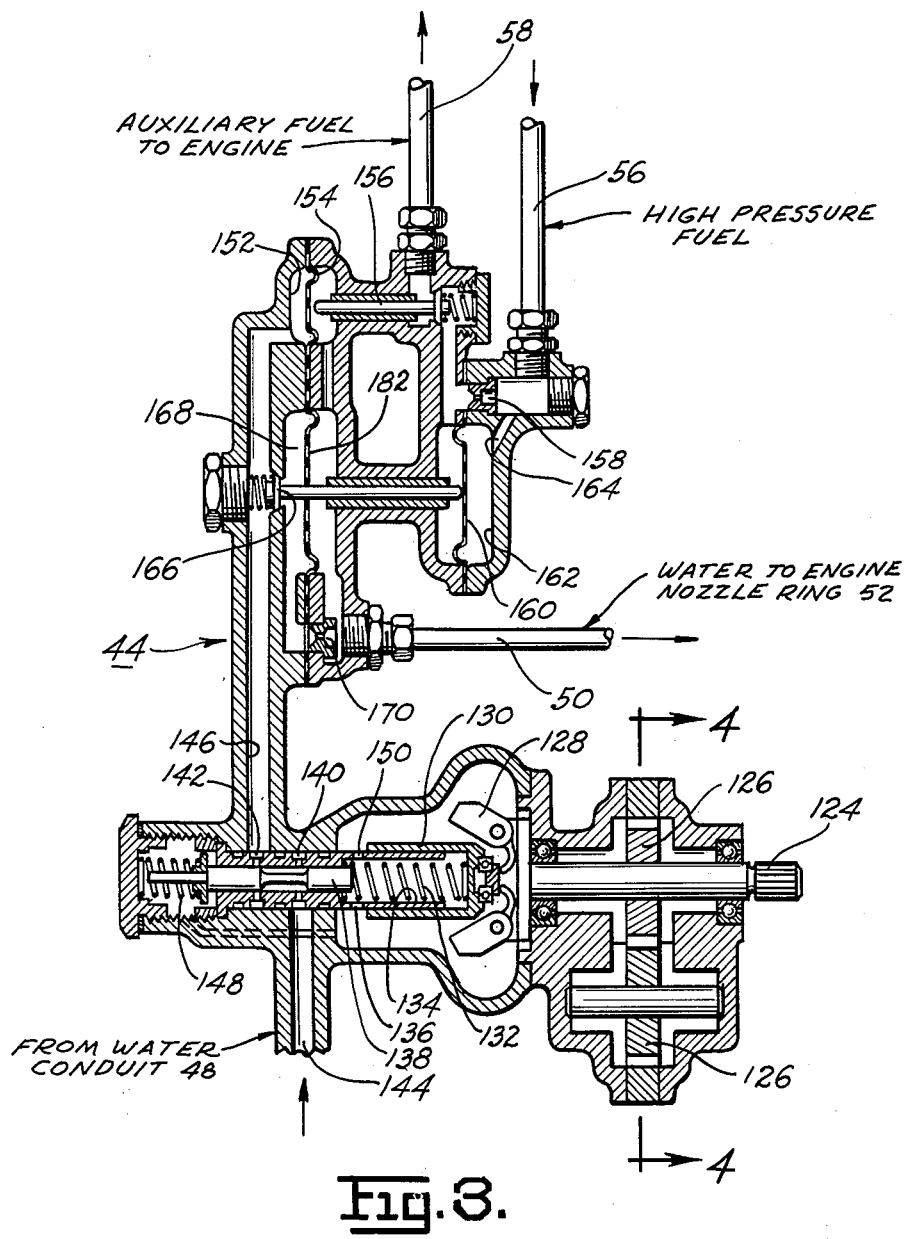
FIGURE 3 is a cross-sectional view of the water control used in conjunction with the device of FIGURE 2.

The water control which is used in conjunction with the metering unit 34 is shown generally in FIGURE 3 at numeral 44. In order to sense an acceleration condition and to drive the water control system, a shaft 124 driven from the gear box 26 is used to drive a gear pump 126 which delivers the water to the metering portions of unit 44 from the water tank 46. Also connected to shaft 124 is a flyweight governor structure 128, the shoes of which urge a balanced piston 130 axially in response to engine speed. In this system, the tendency of the flyweights to move outward is resisted by a spring 132. As the flyweights move outward against spring 132 they cause the piston 130 to move to the left, both compressing the spring and generating a fluid pressure in the chamber 134. The piston 130 slides over a sleeve member 136, and these two members cooperate to define the volume of chamber 134. During an acceleration condition the flyweights 128 move out thereby pushing piston 130 to the left and thereby exerting a force against a balanced piston valve 138. As piston valve 138 is moved to the left it places a pair of ports 140, 142 in communication and water is delivered from a conduit 144 to a conduit 146. Movement of the piston 138 to the left is opposed by the action of a light spring 148. During steady speed conditions the weights 128 achieve an equilibrium of position and it is only during increase of speed that the weights will move outward and thereby move piston 138 to the left and initiate water flow. The rate of pressure rise under acceleration conditions in chamber 134 is defined by a vent 150 in the sidewall of sleeve member 136.

After passing the valve 138 the water continues into passage 146 and raises the pressure in said passage and also in a chamber 152 deflecting a diaphragm 154 therein toward the right and also moving to the right to auxiliary fuel cutoff valve 156.

Referring again to main metering unit 34 (FIGURE 2), in this unit when the demand for maximum acceleration occurs, the governor spring is fully compressed and the metering valve is wide open. At such time the fuel flow is determined by the area of the opening of the metering valve and by the difference in pressure between chambers 70 and 100 on opposite sides of the governor orifice. In order that the auxiliary fuel flow shall be proportional to the main flow, the unmetered fuel chamber 70 of the main control is connected to the auxiliary metering device by the channel 56; this constituting the intake flow passage to the auxiliary fuel metering jet 158. The outlet of auxiliary jet 158 is connected to the main metered fuel pressure of chamber 100 and conduit 104 by the channel 58 leading to the fuel spray nozzle ring 36 or the conduit 104 immediately upstream of nozzle ring 36. A diaphragm 160 in the chamber 162 is in communication with the outlet of metering jet 158, and with the inlet through a conduit 164. The difference in pressure across the diaphragm 160 and the jet 158 will open the water valve 166, thereby allowing water to flow from passage 164 into a chamber 168, past a water metering jet 170, then into conduit 50 which supplies water to the water nozzle ring 52.

Figure 4:
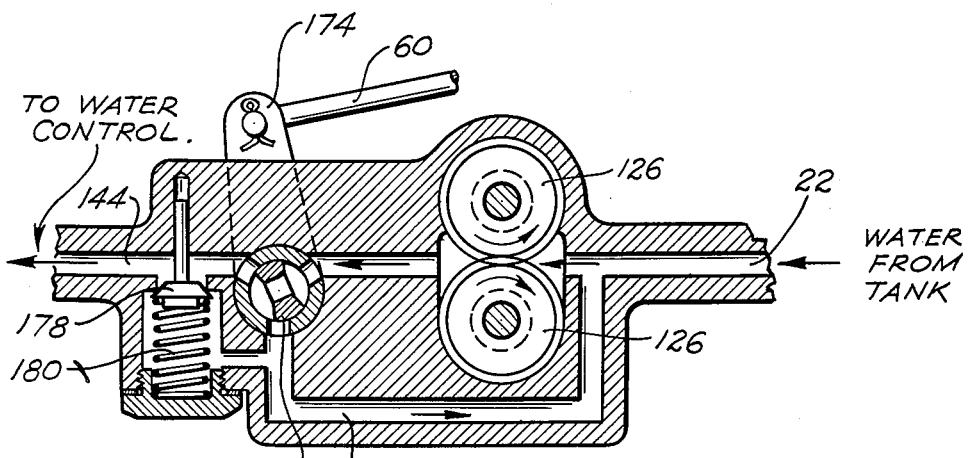
FIGURE 4 is a cross-sectional view of the device of FIGURE 3 taken on line 4—4 of FIGURE 3.

Referring now to FIGURE 4, which is a section of the water supply pump of FIGURE 3, taken on line 4—4, it will be noted that there is a channel 22 from the water supply tank; gears 126 feeding the water onward to duct 144 which leads to the piston valve 138 of FIGURE 3. There is also a by-pass channel 171 around the pump which is controlled by a throttle valve 172 which is operated by a lever 174 connected to the throttle linkage system 60. Referring to FIGURE 1, the throttle lever 42 is shown in the idling position; as it is moved clockwise it opens the main fuel feed, then finally encounters an arm 176 of linkage system 60 and rotates the water valve 172 of FIGURE 4 clockwise. As drawn on FIGURE 4, the valve 172 is shown in an intermediate position with the delivery from the water pump passing partly through to duct 144 to the engine and partly around the pump to the return duct 171; this corresponds to a partial feed of the fuel and water. Clockwise rotation of valve 172 from the position shown will cut off the by-pass 171 and subject the duct 144 to the maximum water pressure as determined by the by-pass valve 178 and by-pass spring 180. Conversely, counterclockwise rotation of the valve 172 will cut off the water pressure from the duct 144 and by-pass the water pump delivery back through the duct 171. The auxiliary fuel metering flow is already determined by the metering action of the main control, which also regulates the pressure differential across the auxiliary fuel metering nozzle 158 (FIGURE 3). The arrangement here employed of having the fuel metering pressure across diaphragm 160 balanced by the water metering pressure across a diaphragm 182 results in the water flow being at all times proportional to the auxiliary fuel flow, the actual flow ratio being determined by the relative sizes of the diaphragms 160 and 182 and the relative sizes of the metering orifices 158 and 170. We therefore have a condition where the flow of auxiliary fuel and water occur on engine acceleration, are in fixed proportion, are mutually regulated by the throttle opening; and in which failure of the water supply immediately results in cutting off the auxiliary fuel supply. This last consideration will become obvious when one realizes that upon a failure of the water supply the diaphragm 154 will revert to its leftmost position thereby causing auxiliary fuel cutoff valve 156 to be closed. If this provision were not made the auxiliary fuel supplied would probably be sufficient to enable the engine to be damaged from overtemperatures.

Figure 5:
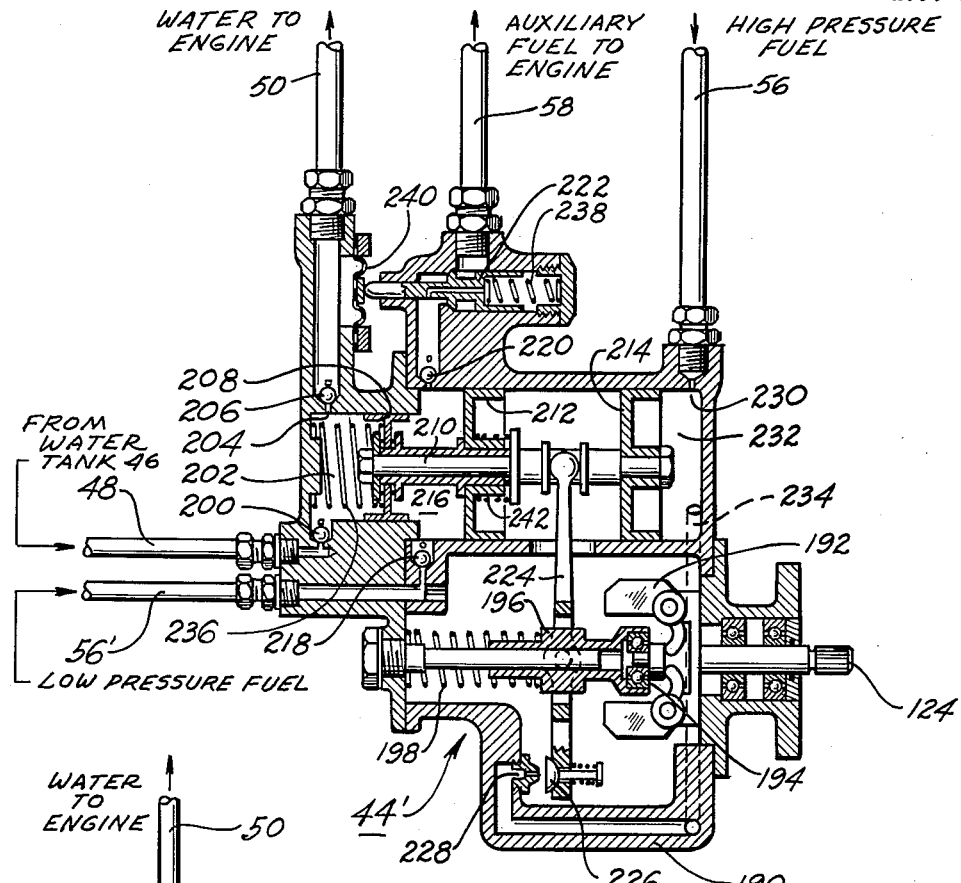
FIGURE 5 is a cross-sectional view of an alternative form of my invention.

FIGURE 5 shows an alternative version of my water control unit which would be installed in the system of FIGURE 1 in the same manner as the device of FIGURE 3. The device of FIGURE 5 is mounted in a housing shown generally at 44'. It is connected to the gear box 26 by means of the drive shaft 124 which, in turn, rotates a set of flyweights 192. The weights 192 exert an axial force on a bearing 194 attached to a sleeve 196. The force thus exerted is opposed by a spring 198. The water for this unit is supplied from the tank 46 through conduit 48 where it enters the housing 190, passes a ball check valve 200 entering a chamber 202. After leaving chamber 202 the water passes through a passageway 204, past a ball check valve 206 and into outlet passage 50. The system of FIGURE 5 calls for a source of fuel at comparatively low pressure and either a high pressure fuel source or a high pressure servo fluid source. It will be obvious to those skilled in the art that the choice of one or the other will be dictated primarily by the availability of servo fluid in the remainder of the system. If the device of FIGURE 5 is used with a main metering system such as that of FIGURE 2 previously described there will be available a convenient source of high pressure fuel which can be supplied to the system through conduit 56. It is also apparent that the pressure level of this same fuel source can be reduced and supplied to the low pressure fuel inlet which will be given numeral 56'. Since, in this system, the water and fuel intakes are accomplished by pump suction, a high supply pressure for auxiliary fuel is not necessary. A water piston 208 is shown as defining one wall of chamber 202. It is connected to a shaft 210 in common with an auxiliary fuel piston 212 and a pumping piston 214. The low pressure auxiliary fuel from conduit 56' is supplied to an auxiliary fuel chamber 216 through a ball check valve 218. Auxiliary fuel leaving chamber 216 passes into the outlet conduit 58 through a ball check valve 220 and a balanced valve 222. Attached to the shaft 210 is a lever 224 having a fulcrum mounted on the sliding sleeve 196. On the other end of lever 224 is a servo valve 226 which controls the flow of high pressure fuel or servo fluid through an orifice 228. A flow of high pressure fuel from conduit 56 then is supplied through a restriction 230 into a chamber 232 where it exerts a force against the pumping piston 214. Chamber 232 is in communication by means of a conduit 234 with the orifice 228 controlled by check valve 226. This system operates as follows: At any fixed engine speed the sleeve 196 takes a position where the moment of the weights 192 just balances the existing compression force on the spring 198; while the lever 224 takes a position with the servo valve 226 sufficiently off its seat 228 that the pressures on pistons 208 and 212 just balance that on the operating piston 214. Upon an acceleration of the engine, the weights 192 move outward and the sleeve 196 and the fulcrum carried thereby move to the left. The orifice 228 is then closed, the pressure in the chamber 232 rises and the pump shaft 210 and its pistons 208, 212 and 214 move to the left, feeding water and fuel through the check valves 206 and 220 and ducts 50 and 58. The leftward travel of shaft 210, however, causes valve 226 to be moved off its seat, the net effect being that the shaft 210 and its pistons come to rest at a new position with valve 226 slightly off its seat as before. Closing the throttle causes the engine to slow down and permits the weights 192 to draw inward, valve 226 comes off its seat, and stem 210 and pistons 208, 212 and 214, assisted by the spring 236 move to the right, refilling the water and auxiliary fuel chambers.

As a safeguard against auxiliary fuel feed occurring with no water present in the system, the balanced valve 222 is interposed between the outlet fuel valve 220 and the fuel outlet conduit 58. This valve is held closed by a light spring 238 against the water pressure in channel 50 acting against a diaphragm 240. The piston 212 is mounted on the shaft 210 in such a manner as to permit a slight axial movement which is taken up by a spring 242. The first thrust leftward on the piston 214 causes piston 208 to follow to the left, and exposes diaphragm 240 to water pressure and opens the balanced valve 222. When leftward travel of shaft 210 ceases, spring 242 returns piston 212 to its extreme leftward position. Thus the water flow acts as a trigger for the fuel flow.

Figure 6:
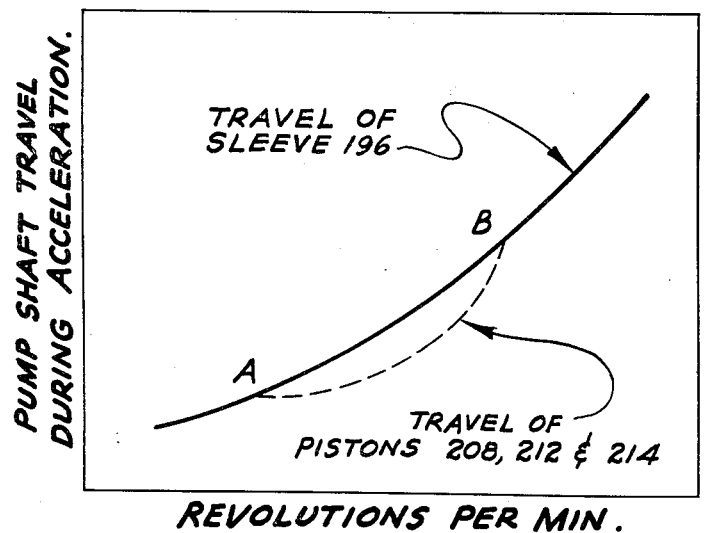
FIGURE 6 is a graph illustrating the operation of the device of FIGURE 5.

In FIGURE 6 is shown a graph in which the travel of pump shaft 210 is plotted on the vertical axis and revolutions per minute of the driving shaft 124 on the horizontal axis. The solid line indicates a position-speed relationship under steady-state or stabilized conditions. Assume that the shaft 210 has stabilized at point A at some given speed, after which the throttle is opened. The sleeve 196 carrying the fulcrum for lever 224 will follow the engine speed up to new steady point B, along the full line. However, the pump stem 210 will lag behind as shown on the dotted line; and during the time it is catching up and moving to its new position there will be a displacement of auxiliary fuel and water to the engine. Obviously the pump delivery will not be closely coordinated either with time or engine speed; but the auxiliary fuel and water will be in fixed proportion.

Figure 7:
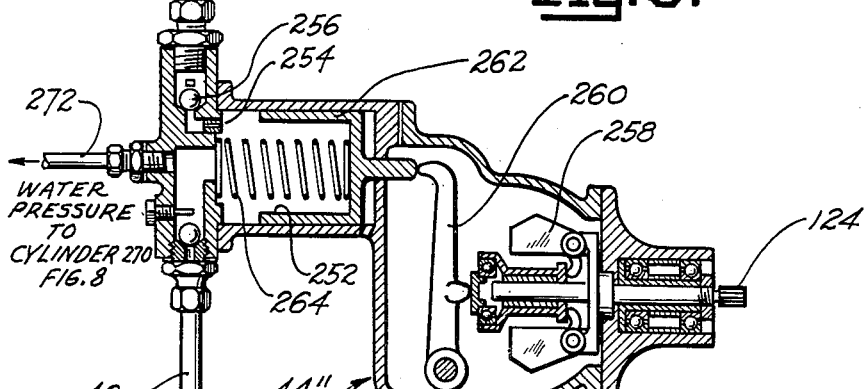
FIGURE 7 is a cross-sectional view of still another form of my invention.

In FIGURE 7 is shown a still further simplification of my water control system in that the water delivery is achieved by displacement pump while the auxiliary fuel feed is accomplished by an addition to the metering head of the main control. Here again, the water control will be associated with the system of FIGURE 2 in essentially the same manner as the previous controls except that there are no conduits such as members 56 and 58 of FIGURES 2, 3 and 5 for carrying the auxiliary fuel to and from the main metering unit 34. In the device of FIGURE 7 the water is supplied from the tank 46 through the conduit 48 into the housing 44'' where it enters a chamber 252. Water leaving chamber 252 passes through a restriction 254, a check valve 256 and into the outlet passage 50. In this system the drive shaft 124 is connected to a governor structure 258 having rather heavy centrifugal weights. The force exerted by these weights is applied through a lever 260 against a piston 262 and is opposed through the action of a fairly heavy spring 264. Upon an increase in speed the weights 258 move outwardly exerting a rather substantial force on the piston 262 and thereby causing a substantial increase in the water pressure in chamber 252. This high pressure causes ball check valve 256 to leave its seat and water to flow through outlet conduit 50.

Figure 8:
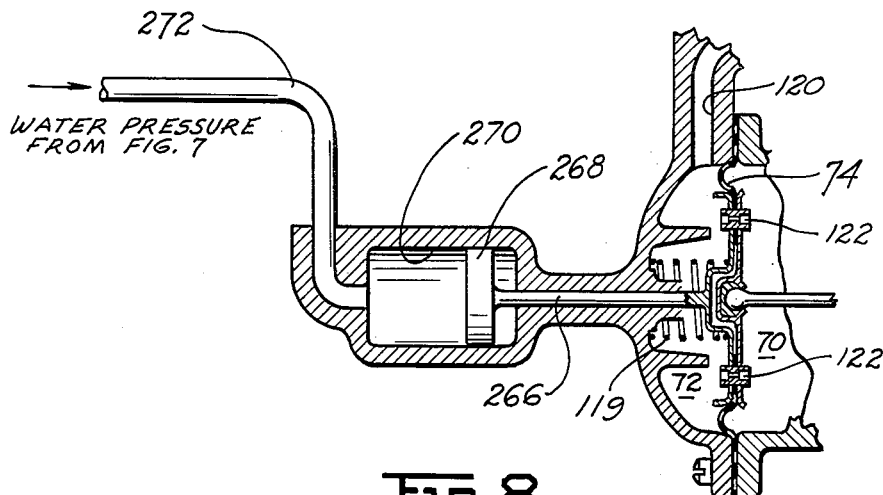
FIGURE 8 is a partial cross-sectional view showing a modification of the device of FIGURE 2.

FIGURE 8 is a partial sectional view of the main metering unit 34 showing the manner in which the head regulating structure is modified to work with the device of FIGURE 7. In the device of FIGURE 2 the movement of the regulator valve 76 in response to changes in speed also causes a movement of the diaphragm 74 and a change in the metering head across the governor valve 88. The structure of FIGURE 8 operates in the same manner with one addition. Connected to the diaphragm 74 is a rod 266 attached to a piston 268 adapted to reciprocate in a cylinder 270. Cylinder 270 is connected with chamber 252 of FIGURE 7 by means of a conduit 272. During an acceleration, when the water pressure in chamber 252 is increased, this increase in pressure is communicated through channel 272 to piston 268 which responds by moving to the right thereby causing the diaphragm 74 to move to the right also. This increases the effective metering area of the regulator valve 76 and is effective to augment the metering head across governor valve 88. In this manner the pumping pressure of the water feed is added to the metering pressure in chamber 70 and to the metering head across the governor valve 88 thereby increasing fuel flow during the time when water is also flowing to the engine.

In operation, assuming the engine is at some steady speed, the moments of the weights 258 will be balanced against the compression of spring 264. If the throttle is opened the weights 258 will tend to fly out, moving lever 260 and piston 262 to the left. Until the piston does move to the left, however, there will be an excess of force of the weight moment over the spring pressure and this force will be available; first, to deliver water through orifice 254 and duct 50 to the engine and second, to supply through duct 272 a pressure which will increase the metering head between chambers 70 and 100 in the main control and thus increase the fuel feed in approximate proportion to the water feed. If no water is present in the chamber 252 there will be no augmentation of fuel flow. Obviously, the device of FIGURE 7 would supply water to the engine even if the device of FIGURE 8 were omitted, but there would be no auxiliary fuel flow.

Although a limited number of embodiments have been set forth herein, changes may be made to suit the requirements of specific applications without departing from the scope of the present invention.

I claim:

1. A system for feeding fuel and an additional fluid to a gas turbine engine comprising a first conduit for delivering fuel to said engine, a metering valve for controlling the effective area of said conduit, a regulating valve for controlling the head across said metering valve, speed responsive means for controlling said regulating valve, a second conduit for delivering said additional fluid to the engine, means responsive to engine acceleration for controlling flow to said second conduit, a valve in said second conduit, a third conduit for delivering auxiliary fuel to the engine, a metering orifice and a cutoff valve in said third conduit, means responsive to the fluid pressure in said second conduit for opening said cutoff valve, and means responsive to the head across said metering orifice for controlling the opening of said valve in said second conduit, said third conduit being connected with said first conduit such that the head across said metering orifice varies with changes in the head across said metering valve.

2. A system for feeding fuel and an additional fluid to a gas turbine engine comprising a first conduit for delivering fuel to said engine, a metering valve for controlling the effective area of said conduit, means for controlling the head across said metering valve, a second conduit for delivering said additional fluid to the engine, means responsive to engine acceleration for controlling flow through said second conduit, a third conduit for delivering auxiliary fuel to the engine, a metering orifice and a cutoff valve in said third conduit, means responsive to the fluid pressure in said second conduit for opening said cutoff valve, and means responsive to the head across said metering orifice for controlling the opening of said valve in said second conduit, said third conduit being connected such that the head across said metering orifice varies with changes in the head across said metering valve.

3. A system for feeding fuel and an additional fluid to a gas turbine engine comprising a first conduit for delivering fuel to said engine, a metering valve for controlling the effective area of said conduit, means for controlling the head across said metering valve, a second conduit for delivering said additional fluid to the engine, means responsive to engine acceleration for controlling flow through said second conduit, a third conduit for delivering auxiliary fuel to the engine, a metering orifice and a cutoff valve in said third conduit, means responsive to the fluid pressure in said second conduit for opening said cutoff valve, said third conduit being connected such that the head across said metering orifice varies with changes in the head across said metering valve.

4. A system for feeding fuel and an additional fluid to a gas turbine engine comprising a first conduit for delivering fuel to said engine, a metering valve for controlling the effective area of said conduit, a regulating valve for controlling the head across said metering valve, speed responsive means for controlling said regulating valve, a second conduit for delivering additional fluid to the engine, means responsive to engine acceleration for controlling flow through said second conduit including a balanced valve for controlling fluid flow through said second conduit, an engine speed responsive flyweight structure, means defining a chamber operatively positioned between said structure and one side of said balanced valve such that upon an acceleration of said engine the force exerted by said structure will cause an increase in the fluid pressure exerted against one side of balanced valve, a cutoff valve in said conduit, a third conduit for delivering auxiliary fuel to the engine, a metering orifice and a second cutoff valve in said third conduit, means responsive to the fluid pressure in said second conduit for opening said second cutoff valve, and means responsive to the head across said metering orifice for controlling the opening of said valve in said second conduit, said third conduit being connected such that the head across said metering orifice varies with changes in the head across said metering valve.

5. A system for feeding fuel and an additional fluid to a combustion chamber of a gas turbine engine having a compressor for supplying air to said combustion chamber comprising a first conduit for delivering fuel to said combustion chamber, a metering valve for controlling the effective area of said conduit, means controlling the head across said metering valve, a second conduit for delivering said additional fluid to the combustion chamber, means responsive to engine acceleration for controlling flow through said second conduit, a third conduit for delivering auxiliary fuel to the combustion chamber, a cutoff valve in said third conduit, and means responsive to the fluid pressure in said second conduit for opening said cutoff valve.

6. A system for feeding fuel and an additional cooling fluid to a gas turbine engine comprising a first conduit for delivering fuel to said engine, a metering valve for controlling the effective area of said conduit, a regulating valve for controlling the head across said metering valve, speed responsive means for controlling said regulating valve, a second conduit for delivering said additional cooling fluid to the engine, means responsive to engine acceleration for controlling flow through said second conduit, means including a shaft, a first piston positioned on said shaft defining a first chamber in said second conduit, second and third pistons positioned on said shaft, a third conduit for delivering auxiliary fuel to said engine including a second chamber partially defined by said first and second pistons, means including the third of said pistons defining a third chamber, a source of high pressure fluid connected to said third chamber, a servo valve for controlling the fluid pressure in said third chamber, engine acceleration responsive means for controlling the position of said servo valve to cause said pistons to move in a direction to decrease the effective volume of said first and second chambers and thereby force said additional fluid and auxiliary fuel to flow towards said engine, a valve in said third conduit downstream of said second chamber, and means responsive to the fluid pressure generated by the flow of said additional cooling fluid through said second conduit downstream of said first chamber for controlling the position of said valve.

7. A system for feeding fuel and an additional cooling fluid to a gas turbine engine comprising a first conduit for delivering fuel to said engine, a metering valve for controlling the effective area of said conduit, means for controlling the head across said metering valve, a second conduit for delivering said additional cooling fluid to the engine, means responsive to engine acceleration for controlling flow through said conduit, a third conduit for delivering auxiliary fuel to said engine, a cutoff valve in said third conduit, means defining first and second chambers in said second and third conduits respectively, servo pressure responsive means for varying the effective volume of said chambers, engine acceleration responsive means for controlling the effective value of said servo pressure to thereby cause said additional cooling fluid and auxiliary fuel to be pumped to the engine, and means responsive to the fluid pressure generated by the flow of said additional cooling fluid through said second conduit downstream of said first chamber for opening said cutoff valve.

8. In a system for feeding fuel to a gas turbine engine having means for controlling the fuel feed to said engine during steady speed operation: means for delivering a flow of auxiliary fuel to said engine as a function of engine acceleration, said means including a metering orifice having a pressure differential thereacross, means for feeding a cooling fluid to the engine as a function of engine speed including a second metering orifice having a pressure differential thereacross, and means for cutting off the flow of auxiliary fuel whenever the pressure differential across the cooling fluid metering orifice is appreciably reduced.

9. A system for feeding fuel and an additional cooling fluid to a gas turbine engine comprising a first conduit for delivering fuel to said engine, a metering valve for controlling the effective area of said conduit, means for controlling the head across said metering valve, a second conduit for delivering said additional cooling fluid to the engine, means responsive to engine acceleration for controlling flow through said second conduit, a third conduit for delivering auxiliary fuel to said engine, means defining first and second chambers in said second and third conduits respectively, servo pressure responsive means for varying the effective volume of said chambers, engine acceleration responsive means for controlling the effective value of said servo pressure to thereby cause said additional cooling fluid and auxiliary fuel to be pumped to the engine, and means responsive to the fluid pressure generated by the flow of said additional cooling fluid through said second conduit downstream of said first chamber for controlling the flow through said third conduit.

10. A system for feeding fuel and an additional cooling fluid to a gas turbine engine comprising a first conduit for delivering fuel to said engine, a metering valve for controlling the effective area of said conduit, means for controlling the head across said metering valve, a second conduit for delivering said additional cooling fluid to the engine, means responsive to engine acceleration for controlling flow through said second conduit, a third conduit for delivering auxiliary fuel to said engine, means defining first and second chambers in said second and third conduits respectively, servo pressure responsive means for varying the effective volume of said chambers, and means responsive to the fluid pressure generated by the flow of said additional cooling fluid through said second conduit for controlling the flow of auxiliary fuel to said engine.

11. A system for feeding fuel and an additional fluid to a gas turbine engine having a combustion chamber and a compressor for supplying air to said combustion chamber comprising a first conduit for delivering fuel to said combustion chamber, a metering valve for controlling the effective area of said conduit, means for controlling the head across said metering valve, a second conduit for delivering said additional fluid to the combustion chamber, means responsive to engine acceleration for controlling flow through said second conduit, and means responsive to the fluid pressure generated by the flow of said additional fluid through said second conduit for controlling the flow of auxiliary fuel to said combustion chamber.

12. A system for feeding fuel and an additional cooling fluid to a gas turbine engine comprising a first conduit for delivering fuel to said engine, a metering valve for controlling the effective area of said conduit, means for controlling the head across said metering valve, a second conduit for delivering said additional cooling fuel to the engine, means responsive to engine acceleration for controlling flow through said second conduit including a flyweight device, a cylinder in said second conduit, a piston in said cylinder operably connected to said flyweight device in such manner that upon an acceleration said piston is moved in a direction to force said additional cooling fluid toward said engine, and means responsive to an increase in the fluid pressure in said cylinder for causing an increase in the head across said metering valve.

13. A system for feeding fuel and an additional cooling fluid to a gas turbine engine comprising a first conduit for delivering fuel to said engine, a metering valve for controlling the effective area of said conduit, means for controlling the head across said metering valve, a second conduit for delivering said additional cooling fluid to the engine, means responsive to engine acceleration for controlling flow through said second conduit including a flyweight device, a cylinder in said second conduit, a piston in said cylinder operatively connected to said flyweight device in such manner that upon an acceleration said piston is moved in a direction to force said additional cooling fluid towards said engine, and means responsive to the fluid pressure generated by the flow of said additional cooling fluid through said second conduit for controlling the flow of auxiliary fluid to said engine.

14. A system for feeding fuel and an additional cooling fluid to a gas turbine engine comprising a first conduit for delivering fuel to said engine, a metering valve for controlling the effective area of said conduit, a second conduit for delivering said additional cooling fuel to the engine, means responsive to engine acceleration for controlling flow through said second conduit, and means responsive to the fluid pressure generated by the flow of said additional cooling fluid through said second conduit for controlling the flow of auxiliary fuel to said engine.

References Cited in the file of this patent

UNITED STATES PATENTS

| | | |
|---|---|---|
| 2,438,998 | Halford | Apr. 6, 1948 |
| 2,468,941 | Orr | May 3, 1949 |
| 2,640,316 | Neal | June 2, 1953 |
| 2,657,530 | Lee | Nov. 3, 1953 |
| 2,841,957 | Thorpe et al. | July 8, 1958 |
| 2,873,577 | Kenney et al. | Feb. 17, 1959 |
| 2,919,548 | Herbstritt | Jan. 5, 1960 |

FOREIGN PATENTS

| | | |
|---|---|---|
| 161,626 | Australia | Mar. 2, 1955 |
| 743,859 | Great Britain | Jan. 25, 1956 |